(12) United States Patent
Mehrotra et al.

(10) Patent No.: US 8,185,593 B2
(45) Date of Patent: May 22, 2012

(54) SYSTEM AND METHOD FOR FREEZING PORTIONS OF A CHAT CONVERSATION IN AN INSTANT MESSAGING SYSTEM

(75) Inventors: Mudit Mehrotra, New Delhi (IN); David M. Ogle, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 993 days.

(21) Appl. No.: 11/868,550

(22) Filed: Oct. 8, 2007

(65) Prior Publication Data
US 2009/0094343 A1  Apr. 9, 2009

(51) Int. Cl.
*G06F 15/16* (2006.01)
*G06F 3/048* (2006.01)
(52) U.S. Cl. ........................ 709/206; 715/764
(58) Field of Classification Search ................... 709/206
See application file for complete search history.

(56) References Cited

U.S. PATENT DOCUMENTS

| | | | | |
|---|---|---|---|---|
| 6,212,553 | B1 * | 4/2001 | Lee et al. ................ | 709/206 |
| 7,624,416 | B1 * | 11/2009 | Vandermolen et al. ....... | 725/109 |
| 7,653,693 | B2 * | 1/2010 | Heikes et al. .............. | 709/206 |
| 7,689,649 | B2 * | 3/2010 | Heikes et al. .............. | 709/204 |
| 7,779,076 | B2 * | 8/2010 | Heikes et al. .............. | 709/206 |
| 2004/0054802 | A1 * | 3/2004 | Beauchamp et al. ......... | 709/238 |
| 2004/0103157 | A1 * | 5/2004 | Requena et al. ............. | 709/206 |
| 2004/0196306 | A1 * | 10/2004 | Manto et al. ................. | 345/700 |
| 2004/0228531 | A1 * | 11/2004 | Fernandez et al. ........... | 382/187 |
| 2004/0236774 | A1 * | 11/2004 | Baird et al. .................. | 707/100 |
| 2004/0268263 | A1 * | 12/2004 | Van Dok et al. ............. | 715/733 |
| 2005/0076110 | A1 * | 4/2005 | Mathew et al. .............. | 709/223 |
| 2005/0080866 | A1 * | 4/2005 | Kent et al. ................... | 709/207 |
| 2006/0053195 | A1 * | 3/2006 | Schneider et al. ........... | 709/204 |
| 2007/0124387 | A1 * | 5/2007 | Galloway ..................... | 709/206 |
| 2007/0143417 | A1 * | 6/2007 | Daigle ......................... | 709/206 |
| 2007/0300169 | A1 * | 12/2007 | Jones et al. .................. | 715/764 |
| 2008/0028031 | A1 * | 1/2008 | Bailey et al. ................. | 709/207 |
| 2008/0068206 | A1 * | 3/2008 | Chakravarty et al. .... | 340/825.36 |
| 2008/0092063 | A1 * | 4/2008 | Canfield et al. ............. | 715/753 |
| 2008/0109406 | A1 * | 5/2008 | Krishnasamy et al. .......... | 707/3 |
| 2008/0141146 | A1 * | 6/2008 | Jones et al. .................. | 715/753 |

* cited by examiner

*Primary Examiner* — Jeffrey Pwu
*Assistant Examiner* — Guang Li
(74) *Attorney, Agent, or Firm* — VanLeeuwen & VanLeeuwen

(57) ABSTRACT

A system, method, and program product is provided that operates during an instant messaging session conducted between a first participant and a second participant. During the session, message sent to or from each participant are displayed in a first instant messaging session window. The two sets of instant messaging messages are displayed in a time-based order in the first instant messaging session window. A notification is received corresponding to one of the displayed instant messaging messages that is displayed in the first instant messaging session window. In response to receiving the notification, the selected instant messaging message is displayed in a second instant messaging session window while still including the selected instant messaging message in the first instant messaging session window.

14 Claims, 8 Drawing Sheets

SYSTEM AND METHOD FOR FREEZING PORTIONS OF A CHAT CONVERSATION IN AN INSTANT MESSAGING SYSTEM

BACKGROUND OF THE INVENTION

1. Technical Field

The present invention relates to a system and method that improves instant messaging. More particularly, the present invention relates to a system and method that improves instant messaging by freezing, or highlighting, important messages in a second instant messaging window.

2. Description of the Related Art

Instant messaging has gained popularity, in part, because a user has an indication of whether a recipient will receive an instant message in a timely manner. The user accomplishes this by checking whether the recipient is logged into an instant messaging server. The instant messaging server handles instant messages that a source instant messaging participant sends to a target instant messaging participant. In addition, the instant messaging server informs a source as to which potential targets that are included in a buddy list are logged on to the instant messaging server.

A challenge with current instant messaging technology, however, is that the dialog (messages to and from another instant messaging participant) are displayed in an instant messaging session window. As instant messaging sessions can often last for extended periods of time, the user is often forced to scroll through past messages in order to reference a previous message. Then, when a new message arrives, the user scrolls to the end of the window to view the new message text. This makes it difficult for instant messaging participants to reference important older IM messages while still reading incoming messages.

SUMMARY

It has been discovered that the aforementioned challenges are resolved using a system, method and computer program product that operates during an instant messaging session conducted between a first computer system used by a first instant messaging participant and a second computer system used by a second instant messaging participant.

During the instant messaging session, a first set of instant messaging messages sent to the first instant messaging participant from the second instant messaging participant and a second set of instant messaging messages sent from the first instant messaging participant to the second instant messaging participant are displayed on a display device accessible to the computer system. The two sets of instant messaging messages are displayed in a time-based order in a first instant messaging session window.

A notification is received corresponding to one of the displayed instant messaging messages that is displayed in the first instant messaging session window. In response to receiving the notification, the selected instant messaging message is displayed in a second instant messaging session window while still including the selected instant messaging message in the first instant messaging session window.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention. Instead, the following is intended to provide a detailed description of an example of the invention and should not be taken to be limiting of the invention itself. Rather, any number of variations may fall within the scope of the invention, which is defined by the claims that follow the description.

The following detailed description will generally follow the summary of the invention, as set forth above, further explaining and expanding the definitions of the various aspects and embodiments of the invention as necessary. To this end, this detailed description first sets forth a computing environment in FIG. 1 that is suitable to implement the software and/or hardware techniques associated with the invention. A networked environment is illustrated in FIG. 2 as an extension of the basic computing environment, to emphasize that modern computing techniques can be performed across multiple discrete devices.

Figure 1:
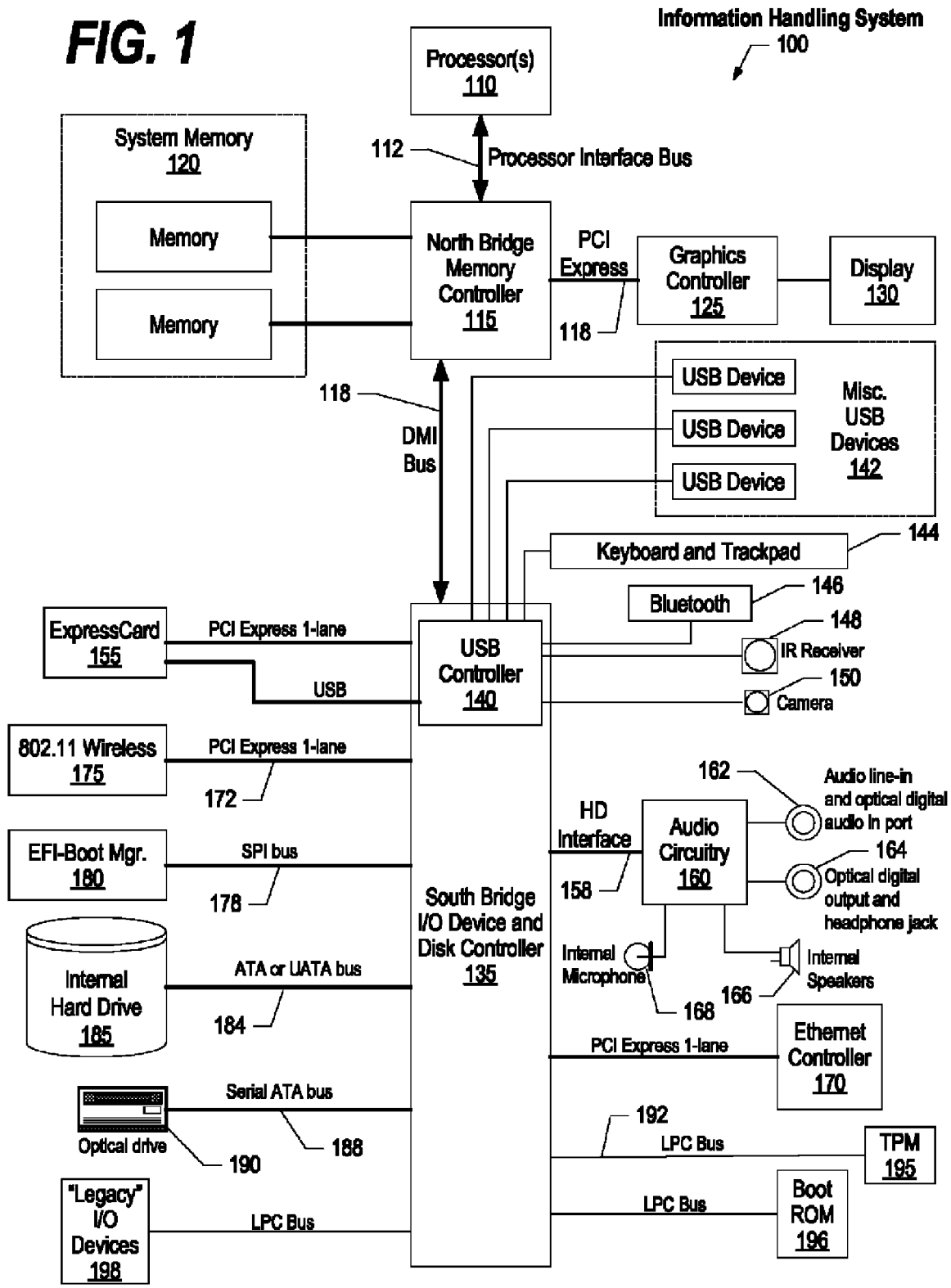
FIG. 1 is a block diagram of a data processing system in which the methods described herein can be implemented.
Figure 2:
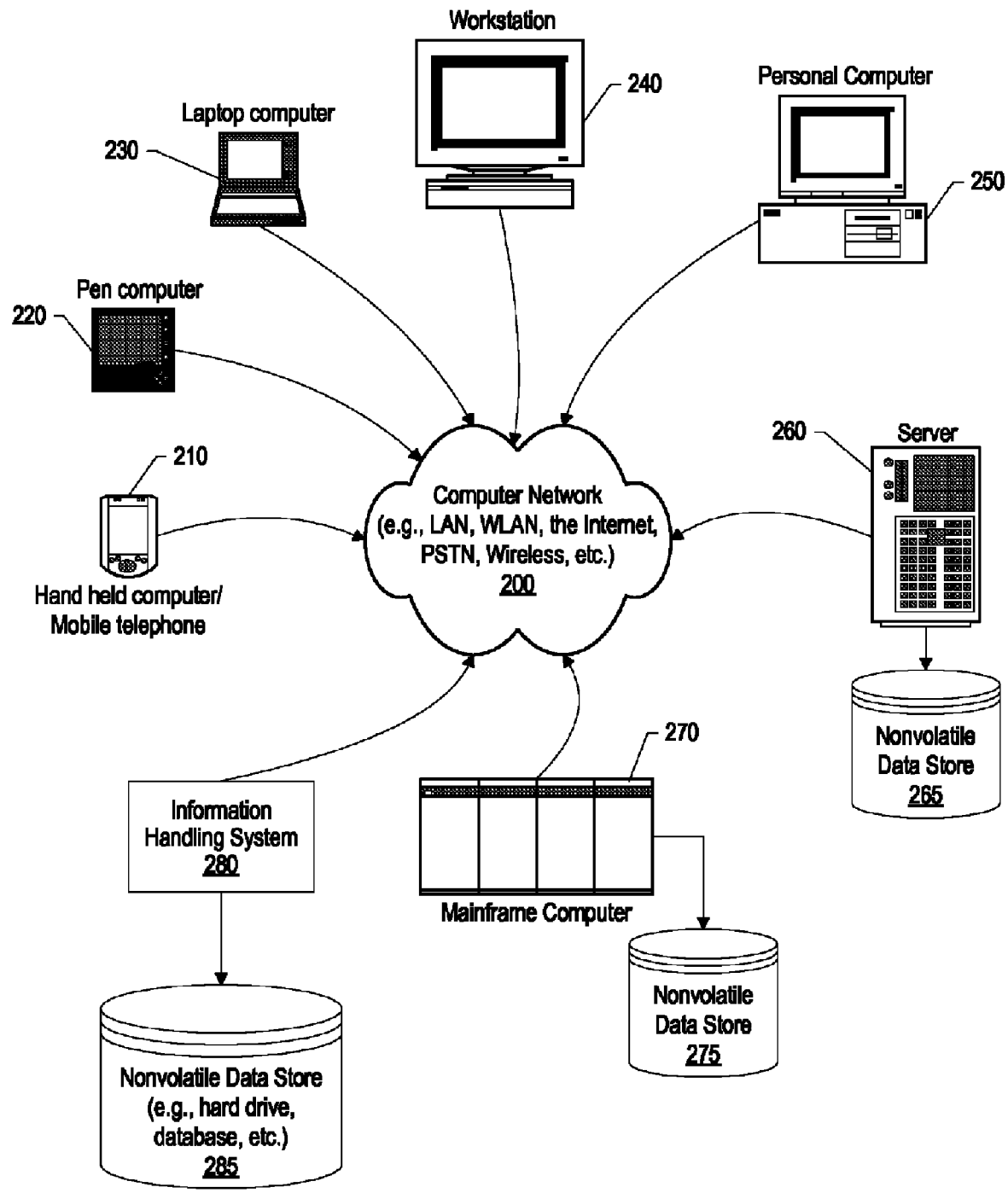
FIG. 2 provides an extension of the information handling system environment shown in FIG. 1 to illustrate that the methods described herein can be performed on a wide variety of information handling systems which operate in a networked environment.

FIG. 1 illustrates information handling system 100 which is a simplified example of a computer system capable of performing the computing operations described herein. Information handling system 100 includes one or more processors 110 which is coupled to processor interface bus 112. Processor interface bus 112 connects processors 110 to Northbridge 115, which is also known as the Memory Controller Hub (MCH). Northbridge 115 is connected to system memory 120 and provides a means for processor(s) 110 to access the system memory. Graphics controller 125 is also connected to Northbridge 115. In one embodiment, PCI Express bus 118 is used to connect Northbridge 115 to graphics controller 125. Graphics controller 125 is connected to display device 130, such as a computer monitor.

Northbridge 115 and Southbridge 135 are connected to each other using bus 118. In one embodiment, the bus is a Direct Media Interface (DMI) bus that transfers data at high speeds in each direction between Northbridge 115 and Southbridge 135. In another embodiment, a Peripheral Component Interconnect (PCI) bus is used to connect the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses can include PCI and PCI Express busses, an ISA bus, a System Management Bus (SMBus or SMB), a Low Pin Count (LPC) bus. The LPC bus is often used to connect low-bandwidth devices, such as boot ROM 196 and "legacy" I/O devices (using a "super I/O" chip). The "legacy" I/O devices (198) can include serial and parallel ports, keyboard, mouse, floppy disk controller. The LPC bus is also used to connect Southbridge 135 to Trusted Platform Module (TPM) 195. Other components often included in Southbridge 135 include a Direct Memory Access (DMA) controller, a Programmable Interrupt Controller (PIC), a storage device controller, which connects Southbridge 135 to nonvolatile storage device 185, such as a hard disk drive, using bus 184.

ExpressCard 155 is a slot used to connect hot-pluggable devices to the information handling system. ExpressCard 155 supports both PCI Express and USB connectivity as it is connected to Southbridge 135 using both the Universal Serial Bus (USB) the PCI Express bus. Southbridge 135 includes USB Controller 140 that provides USB connectivity to devices that connect to the USB. These devices include webcam (cameral) 150, infrared (IR) receiver 148, Bluetooth device 146 which provides for wireless personal area networks (PANs), keyboard and trackpad 144, and other miscellaneous USB connected devices 142, such as a mouse, portable storage devices, modems, network cards, ISDN connectors, fax, printers, USB hubs, and many other types of USB connected devices.

Wireless Local Area Network (LAN) device 175 is connected to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Optical storage device 190 is connected to Southbridge 135 using Serial ATA (SATA) bus 188. Serial ATA adapters and devices communicate over a high-speed serial link. The Serial ATA bus is also used to connect Southbridge 135 to other forms of storage devices, such as hard disk drives. Audio circuitry 160, such as a sound card, is connected to Southbridge 135 via bus 158. Audio circuitry 160 is used to provide functionality such as audio line-in and optical digital audio in port 162, optical digital output and headphone jack 164, internal speakers 166, and internal microphone 168. Ethernet controller 170 is connected to Southbridge 135 using a bus, such as the PCI or PCI Express bus. Ethernet controller 170 is used to connect information handling system 100 with a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

FIG. 2 provides an extension of the information handling system environment shown in FIG. 1 to illustrate that the methods described herein can be performed on a wide variety of information handling systems which operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling system include nonvolatile data stores, such as hard drives and/or nonvolatile memory. Some of the information handling systems shown in FIG. 2 are depicted with separate nonvolatile data stores (server 260 is shown with nonvolatile data store 265, mainframe computer 270 is shown with nonvolatile data store 275, and information handling system 280 is shown with nonvolatile data store 285). The nonvolatile data store can be a component that is external to the various information handling systems or can be internal to one of the information handling systems. In addition, while not shown, an individual nonvolatile data store can be shared amongst two or more information handling systems using various techniques.

Figure 3:
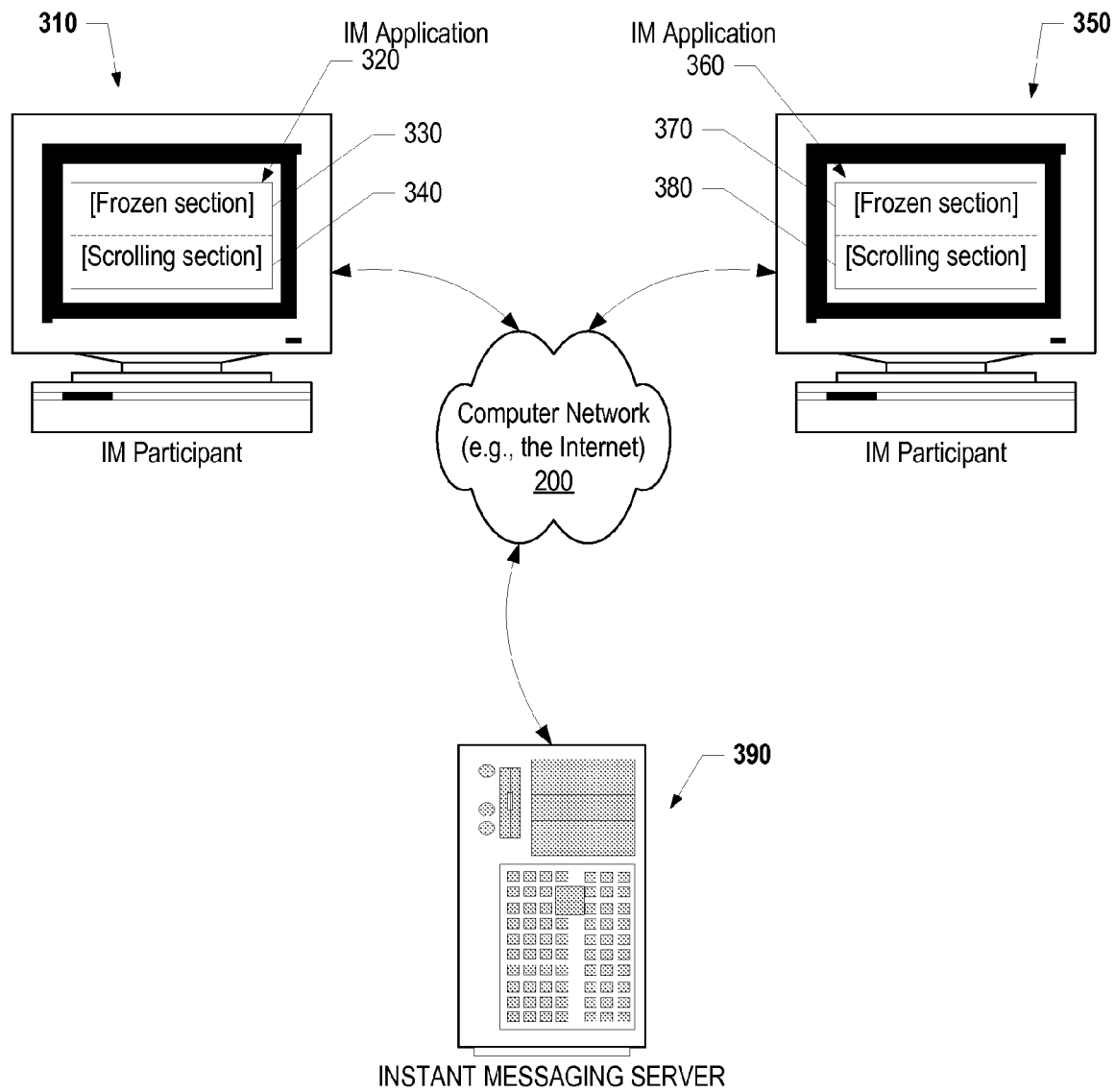
FIG. 3 is a diagram showing two instant messaging participants using instant messaging programs that includes a frozen section of selected messages and a scrolling section of the instant messaging messages transmitted during the instant messaging session.

FIG. 3 is a diagram showing two instant messaging participants using instant messaging programs that includes a frozen section of selected messages and a scrolling section of the instant messaging messages transmitted during the instant messaging session. First instant messaging participant computer system 310 is shown with instant messaging application 320 running that includes two instant messaging session windows: instant messaging session window 330 and instant messaging session window 340. Instant messaging session window 340 is a scrolling window where messages are displayed in a time-based order based on when the message arrived in the window. Instant messaging session window 330, on the other hand, is used to display selected messages that are also in window 340. In one embodiment, window 340 is a scrollable window, as described above, whereas window 330 is a fixed, or non-scrollable window. Likewise, instant messaging participant computer system 350 is shown running instant messaging application 360 that includes instant messaging session windows 370 and 380 that correspond to windows 330 and 340, respectively.

While two instant messaging session windows are described as being used herein (windows 330 and 340 for participant 310 and windows 370 and 380 for participant 350), it will be appreciated by those skilled in the art, having benefit of the details provided herein, that selected messages could each be displayed in separate windows (e.g., a second session window 330 or 370 created for each of the selected messages). In addition, the scrolling first instant messaging session window and the "frozen" second instant messaging session window can appear to be a single window with one part scrolling, or scrollable (the first instant messaging session window), and one part fixed, or frozen (the second instant messaging session window). Essentially, therefore, the second (frozen) instant messaging session window is a container for selected messages that have been selected for some reason (e.g., the message is important, includes reference data such as a telephone number, contains sensitive or confidential information, etc.).

Various notification means are provided in order to select the messages that appear in instant messaging window 330. In one embodiment, the user of computer system 310 selects messages from window 330 and these selected messages are copied to window 320. For example, the user can use a pointing device, such as a mouse, to select one or more messages displayed in window 330 and the text of these messages is copied to window 320. In another embodiment, instant messaging server 390 is used to note messages that will appear in both windows 330 and 340. In this embodiment, instant messaging server 390 is configured to identify specific words in instant messaging messages transmitted between instant messaging participants 310 and 350. For example, a company can configure instant messaging server 390 to add a notification flag to any instant messaging message that includes the word "confidential." When a message is transmitted that includes the word "confidential," the message is flagged by instant messaging server 390. When the message arrives at the recipient's computer system, the flag (added by the server), is identified by the participant's computer system and the message is automatically added to both instant messaging session windows (e.g., windows 330 and 340 or windows 370 and 380). In yet another embodiment, the sender of the instant messaging message can flag the message as being important or otherwise needing to be highlighted when received by the recipient. In this embodiment, similarly to the second embodiment described above, the flagged message is identified at the recipient's computer system and included in both instant messaging session windows (e.g., windows 330 and 340 or windows 370 and 380).

Figure 4:
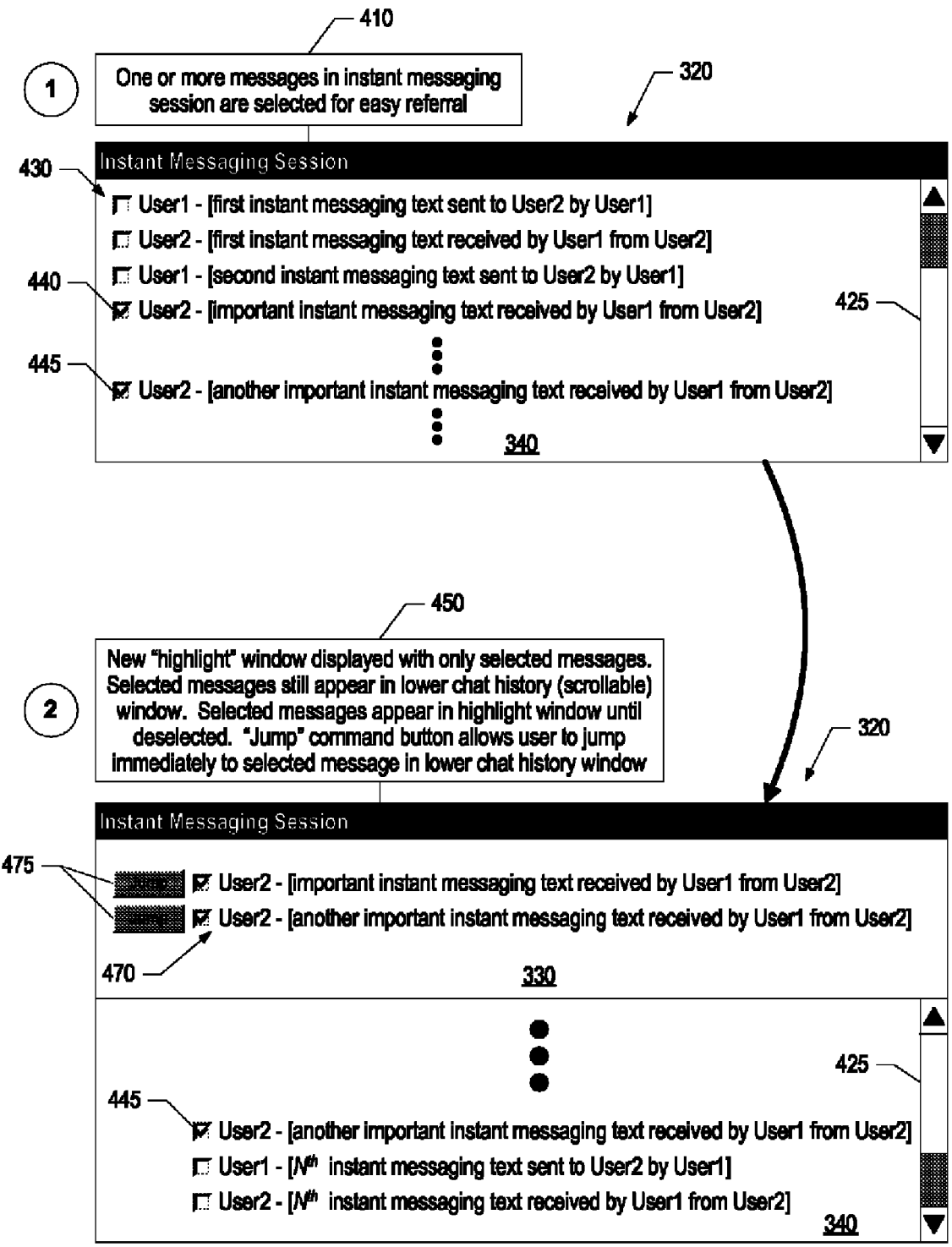
FIG. 4 is a screen diagram showing a user selecting instant messaging messages and the messages appearing in a second window.

FIG. 4 is a screen diagram showing a user selecting instant messaging messages and the messages appearing in a second window. FIG. 4 depicts instant messaging participant 310 from FIG. 3 using instant messaging application 320 to select messages that will appear in window 330. In one embodiment, as shown in FIG. 4, instant messaging application 320 only displays instant messaging session window 340 until at least one message has been identified to be shown in instant messaging session window 330. At step 410, one or more instant messaging messages are selected by the user (instant messaging participant that is using instant messaging application 320) by selecting one or more messages 430 that appear in window 340. The vertical ellipses represent that more messages are displayed in window 340 than can be viewed at one time. In many cases, only a minority of messages 430 are visible in window 340 at any given time. In order to view additional messages, the user uses vertical scroll bar 425 to navigate up and down through messages 430 that appear in window 340.

In the example shown, at step 410, the user has identified message 440 and message 445 by selecting the messages using a graphical selection tool. Note the vertical ellipse between messages 440 and 445 indicating that the messages are separated by other messages that, while displayed in window 340, are not shown in FIG. 4. Because messages 440 and 445 are separated by other messages, they might not both be viewable at the same time, so the user would use vertical scroll bar 425 to scroll window 340 between the various messages and select the messages (440 and 445) when they are visible. In the embodiment shown, a checkbox control is used as the graphical selection tool. In another embodiment, the graphical selection tool is the user selecting the message text by positioning a graphical cursor (e.g., a mouse cursor) over the text and selecting it. In another embodiment, the message is selected by the user scrolling over the desired message using the up and down arrows on the keyboard and selecting the message using another key, such as the spacebar. In some of these embodiments, multiple messages can be selected simultaneously by, e.g., holding down a particular key, such as the "control" key while making the selections.

At step 450, after the user has selected messages 440 and 445, instant messaging session window 330 appears and includes copies 470 of the two messages that were selected by the user. "Jump" command buttons 475 also appear next to the messages that appear in instant messaging session window 330. The command buttons are examples of graphical navigational controls that are displayed in a position proximate to the copies of the instant messaging messages that are displayed in window 330. When the user selects one of the graphical navigational controls (one of the command buttons 474), then window 340 is scrolled to a position where the corresponding message is visible in window 340 (with window 340 including essentially all of the messages transmitted during the instant messaging session in a time-based order). In this manner, the user can utilize command buttons 475 to navigate (scroll) directly to the corresponding message, essentially using the copies of messages in window 330 as bookmarks for locations within the longer instant messaging session log that is displayed in window 340. For example, when the bottommost command button is selected, window 340 is scrolled to a position where instant messaging message 445 is visible. In one embodiment, the message is vertically centered in window 340.

Figure 5:
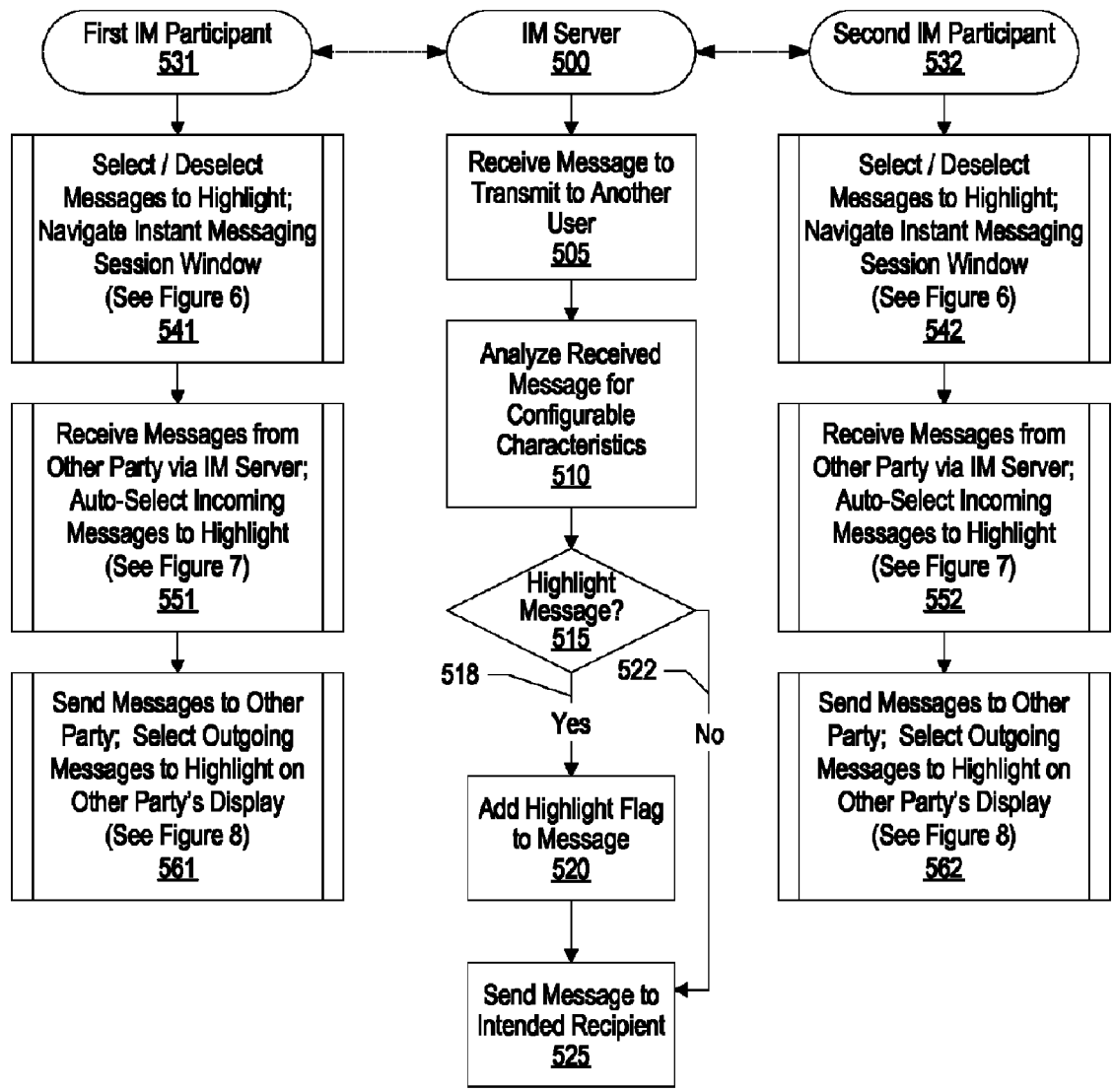
FIG. 5 is a flowchart showing steps taken by instant messaging participants and an instant messaging server in conducting an instant messaging session between the participants.

FIG. 5 is a flowchart showing steps taken by instant messaging participants and an instant messaging server in conducting an instant messaging session between the participants. Instant messaging server 500 manages an instant messaging session conducted between first instant messaging participant 531 and second instant messaging participant 532. After the instant messaging session is established between the participants, message transmission between the participants is facilitated by instant messaging server 500. At step 505, the instant messaging server receives a message from one instant messaging participant that is directed to another instant messaging participant. At step 510, the instant messaging server analyzes the text in the message for configurable characteristics. For example, an organization could configure instant messaging server 500 so that any message with the word "confidential" or "sensitive" would automatically be flagged as important. A determination is made, based upon the analysis, as to whether the message that is being transmitted should be highlighted (decision 515). Highlighting the message would result in the message being displayed in both windows 330 and 340 shown in FIGS. 3 and 4). If the analysis identified the message as needing to be highlighted, based on the instant messaging server configuration, then decision 515 branches to "yes" branch 518 whereupon, at step 520, a flag is added to the message. The flag informs the recipient's computer system that the message is important and should be displayed in both windows 330 and 340. On the other hand, if the analysis did not identify the message as needing to be highlighted, then decision 515 branches to "no" branch 522 bypassing step 520. At step 525 the message (either flagged or not flagged) is sent to the computer system of the instant messaging participant who is receiving the message.

Turning to operations performed by the computer systems used by the instant messaging participants, first and second instant messaging participants 531 and 532, respectively, perform predefined processes 541 and 542, respectively, that are used to select and deselect instant messaging messages to highlight (include in window 330 as seen in FIGS. 3 and 4), as well as navigate the instant messaging session window, using "jump" command buttons 475 that were shown in FIG. 4. Details regarding steps performed in predefined process 541 and 542 are shown in the flowchart depicted in FIG. 6.

First and second instant messaging participants 531 and 532, respectively, perform predefined processes 551 and 552, respectively, that are used to receive instant messaging messages from the other instant messaging participant and auto-select messages, based on flags, to highlight (include in window 330 as seen in FIGS. 3 and 4). Details regarding steps performed in predefined process 551 and 552 are shown in the flowchart depicted in FIG. 7.

First and second instant messaging participants 531 and 532, respectively, perform predefined processes 561 and 562, respectively, that are used to send instant messaging messages to the other instant messaging participant and allow the sender to select which messages to highlight (include in window 330 as seen in FIGS. 3 and 4). When a sender selects a message to highlight, a flag is included in the outgoing message that, when processed by either predefined process 551 or 552, automatically selects the message for inclusion in window 330. Details regarding steps performed in predefined process 561 and 562 are shown in the flowchart depicted in FIG. 8.

Figure 6:
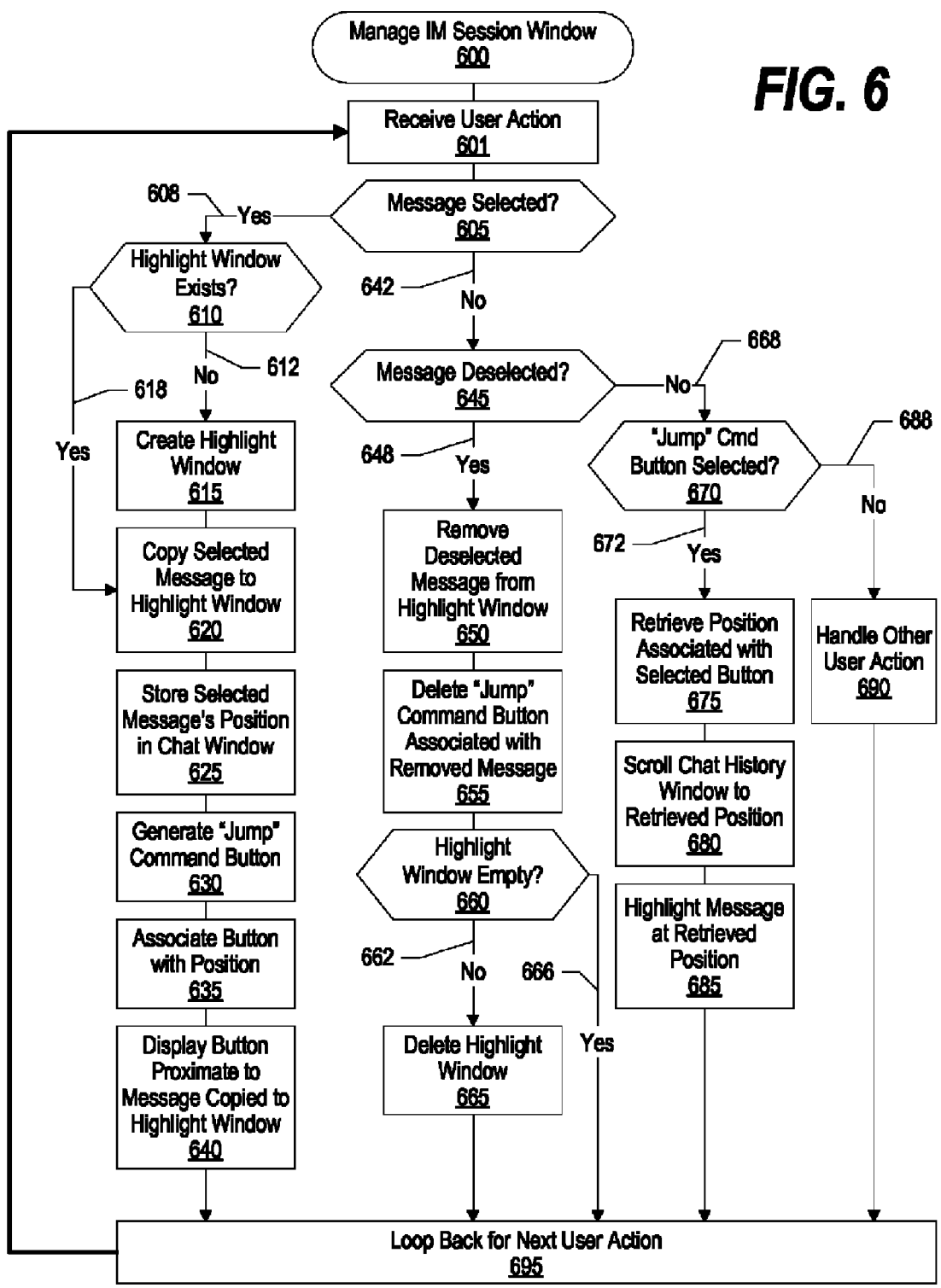
FIG. 6 is a flowchart showing steps taken to select and deselect messages as well as navigate the instant messaging session.

FIG. 6 is a flowchart showing steps taken to select and deselect messages as well as navigate the instant messaging session. Processing commences at 600 whereupon, at step 601, a request from the user of the instant messaging application is received. A determination is made as to whether the user has selected one of the messages that is displayed in the first instant messaging session window (decision 605). An example of the first instant messaging session window is window 340 shown in FIG. 3. If one of the messages that is displayed in the first instant messaging session window has been selected, then decision 605 branches to "yes" branch 608 to process the request.

A determination is made as to whether the second instant messaging session window already exists (decision 610). An example of the second instant messaging session window is window 330 shown in FIG. 3. In one embodiment, the second instant messaging session window is not displayed until at least one of the messages has been selected. In this embodiment, if the second instant messaging session window has not yet been created, then decision 610 branches to "no" branch 612 whereupon, at step 615, the second instant messaging session window is created. On the other hand, if the second instant messaging session window has already been created, then decision 610 branches to "yes" branch 618 bypassing step 615. As indicated, this second instant messaging session window is used to display selected, or "highlighted" messages in the second window. The first instant messaging session window is a scrollable window used to display essentially all instant messaging messages transmitted during the instant messaging session in a time-based orientation, while the second instant messaging session window is used to display those messages that have been selected (e.g., important messages), from the first instant messaging session window. Selected messages appear, therefore, in both the first and second instant messaging session windows, while non-selected messages only appear in the first instant messaging session window.

At step 620, the instant messaging message selected by the user is copied from the first instant messaging session window to the second instant messaging session window. At step 625, the position of the copied message in the first instant messaging session window is stored for later retrieval, and at step 630 a graphical navigational control is created and displayed in a position proximate (near) to where the message appears in the second instant messaging session window. In one embodiment, the graphical navigational control is a command button that, when selected, scrolls the first instant messaging session window to the location of the message in the first window. In this manner, the graphical navigational control acts as a bookmark to aid in navigating (jumping) to the location in the first instant messaging session window. At step 635, the graphical navigational control is associated with the stored position, and at step 640, the graphical navigational is displayed in a position proximate to the message as it appears in the second instant messaging session window. For an example, see control 475 in FIG. 4. At step 695, processing loops back to receive and process the next user request.

Selected messages appear in the second instant messaging session window until they are deselected by the user. In one embodiment, the user uses a graphical control to deselect the message from the second instant messaging session window. If the user did not select a message, a determination is made as to whether the user has deselected one of the messages that currently appears in the second instant messaging session window (decision 645). If the user has requested to deselect one of the messages, then decision 645 branches to "yes" branch 648 whereupon, at step 650, the message that has been deselected is removed from the second instant messaging session window. At step 655, the graphical navigational control that was displayed in the position proximate to the removed message is also removed (deleted). A determination is then made as to whether the second instant messaging session window still includes one or more messages (decision 660). If the second instant messaging session window no longer includes any messages, then decision 660 branches to "no" branch 662 whereupon, at step 665, the second instant messaging session window is removed (deleted) from the instant messaging application. On the other hand, if one or more messages still appear in the second instant messaging session window, then decision 660 branches to "yes" branch 666 bypassing step 665. At step 695, processing loops back to receive and process the next user request.

Returning to decision 645, if a message has not been selected or deselected, then decision 645 branches to "no" branch 668 whereupon, a determination is made as to whether one of the graphical navigational controls has been selected by the user (decision 670). If one of the controls has been selected by the user, then decision 670 branches to "yes" branch 672 whereupon, at step 675, the position of the message as it appears in the first instant messaging session window is retrieved. At step 680, the first instant messaging session window is scrolled to the retrieved position so that the message is viewable in the first instant messaging session window. At step 685, the message is highlighted in the first instant messaging session window. In one embodiment, highlighting is performed by vertically centering the message in the first instant messaging session window. In another embodiment, the message is graphically highlighted (e.g., using a font, background color, etc.) in the first instant messaging session window. At step 695, processing loops back to receive and process the next user request. If the user has not selected or deselected a message and has not selected one of the graphical navigational controls, then decision 670 branches to "no" branch 688 whereupon, at step 690, another type of user action is handled, after which processing loops back to handle the next request at step 695.

Figure 7:
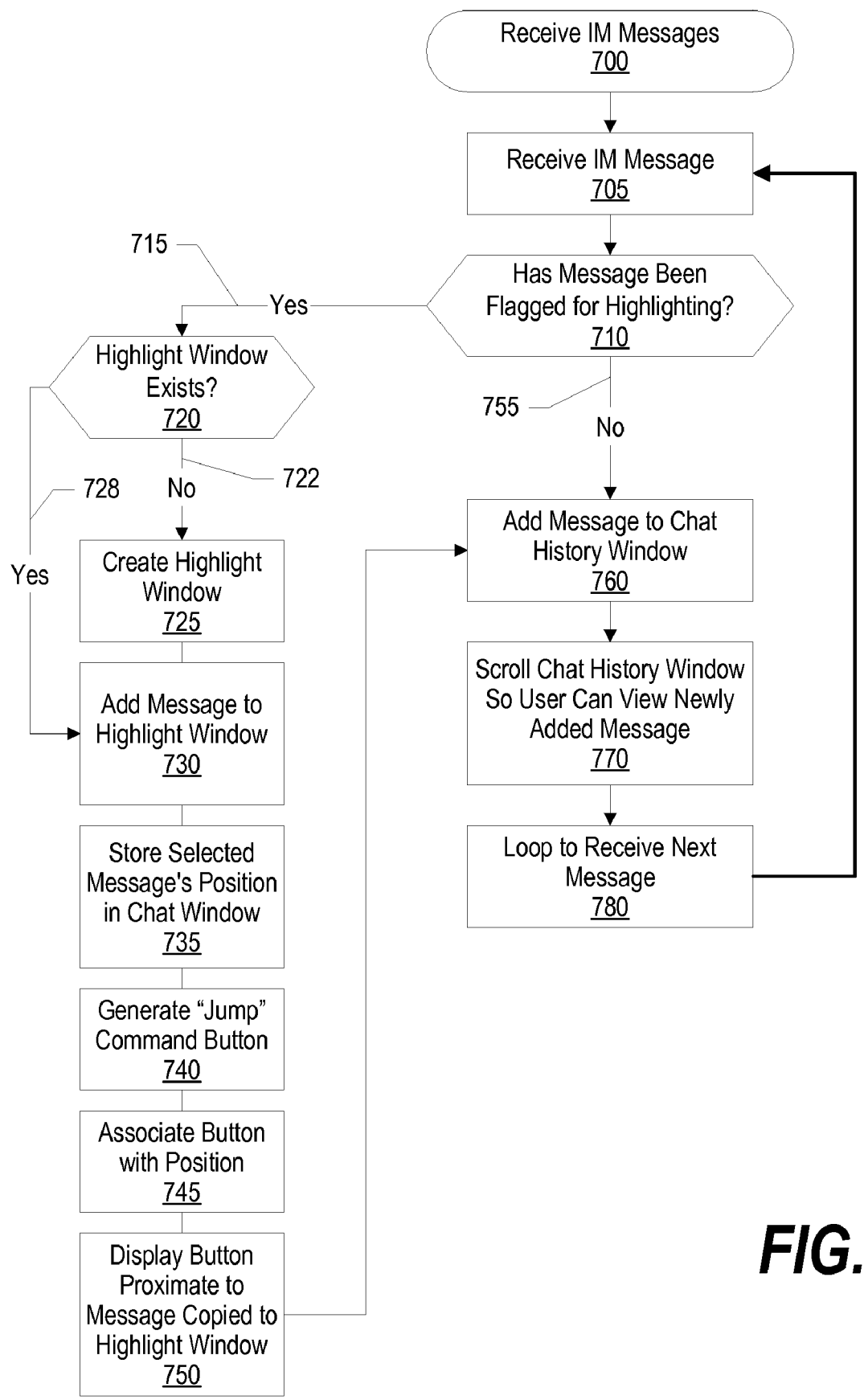
FIG. 7 is a flowchart showing steps taken to receive instant messaging messages including those flagged for highlighting.

FIG. 7 is a flowchart showing steps taken to receive instant messaging messages including those flagged for highlighting. Processing commences at 700 whereupon, at step 705, an instant messaging message is received by the instant messaging participant's computer system. A determination is made as to whether the received message has been flagged (either by the instant messaging server or by the sender of the message) in decision 710. If the message has been flagged, then decision 710 branches to "yes" branch 715 whereupon, a determination is made as to whether the second instant messaging session window already exists (decision 720). If the second instant messaging session window does not exist, then decision 720 branches to "no" branch 722 whereupon, at step 725, it is created. On the other hand, if the second instant messaging session window already exists, then decision 720 branches to "yes" branch 728 bypassing step 725.

At step 730, the received message is added to the second instant messaging session window. At step 735, the position of the copied message in the first instant messaging session window is stored for later retrieval, and at step 740 a graphical navigational control is created and displayed in a position proximate (near) to where the message appears in the second instant messaging session window. At step 745, the graphical navigational control is associated with the stored position, and at step 750, the graphical navigational is displayed in a position proximate to the message as it appears in the second instant messaging session window. For an example of a graphical navigational control, see control 475 in FIG. 4. Returning to decision 710, if the received message has not been flagged, then decision 710 branches to "no" branch 755 bypassing steps 720 through 750.

Regardless of whether the message was flagged, at step 760, the message is added to first instant messaging session window 760. At step 770, the first instant messaging session window is scrolled to a position where the user can view the newly added message. Finally, at step 780, processing loops back to receive and process the next incoming instant messaging message.

Figure 8:
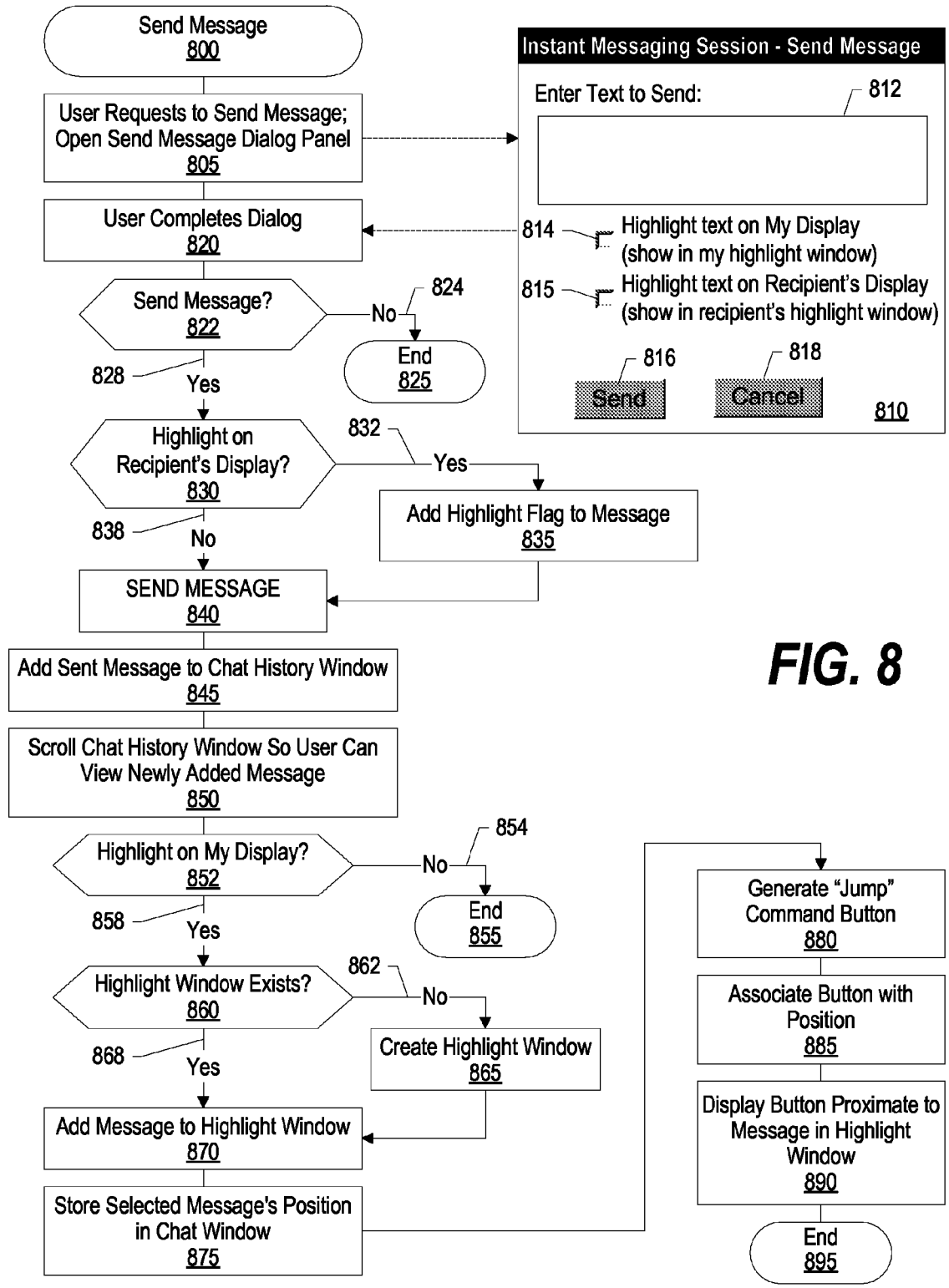
FIG. 8 is a flowchart showing steps taken to send instant messaging messages including steps to highlight the message in a second window on either participants' system.

FIG. 8 is a flowchart showing steps taken to send instant messaging messages including steps to highlight the message in a second window on either participants' system. Processing commences at 800 whereupon, at step 805, the user requests to send a message resulting in the use of send message dialog 810. Send message dialog may be a popup window opened when the user requests to send a message or may alternatively be a separate window in the instant messaging application that the user selects using a pointing device (e.g., a mouse) or keyboard actions (e.g., a tab key). Send message dialog 810 includes text area 812 into which the user enters the text that they wish to send to the other instant messaging participant. In addition, checkboxes 814 and 815 are used to indicate (flag) whether the message that is being sent should be highlighted in the user's second instant messaging session window, in the case of checkbox 814 (see FIGS. 3 and 4, window 330 for an example of a second instant messaging session window). When checkbox 815 is selected, a flag will be included in the message, as will be described in steps 830-835. When the flagged instant messaging message is received by the receiving instant messaging participant, the instant messaging application running on the recipient's computer system will recognize the flag and write the message to both the recipient's first and second instant messaging session windows (see FIG. 7, steps 710-750 for details on receiving a flagged message). Other controls included in send message dialog 810 include send command button 816 that the user selects to send the message and cancel command button 818 that the user selects if he or she does not wish to send the message.

At step 820, the user completes the send message dialog and the data entered into send message dialog 810 is processed. A determination is made as to whether the user selected to send the message by selecting send command button 816 (decision 822). If the user did not decide to send the message (e.g., cancel command button 818 was selected), then decision 822 branches to "no" branch 824 and send message processing ends at 825.

On the other hand, if the user decided to send the message (e.g., send command button 816 was selected), then decision 822 branches to "yes" branch 828 whereupon, a determination is made as to whether the user selected to highlight the message on the recipient's display (decision 830). This determination is based on whether checkbox 815 has been selected (checked) by the user. If the user selected to highlight the message on the recipient's display, then decision 830 branches to "yes" branch 832 whereupon, at step 835, a flag is added to the message that will inform the instant messaging application running on the recipient's computer system that the message is important and should be displayed in the second instant messaging session window as well as in the first instant messaging session window. On the other hand, if the user did not select to highlight the message on the recipient's display, then decision 830 branches to "no" branch 838 bypassing step 835. At step 840, the message (with or without the flag being added) is sent to the recipient (via the instant messaging server using the computer network that connects the user's computer system, the instant messaging server, and the recipient's computer system).

At step 845, the message that is sent to the recipient is also added to the user's first instant messaging session window that stores a time-based history of the messages transmitted between the user and the other instant messaging participant. At step 850, the first instant messaging session window is scrolled to a position so that the user can view the message that was sent. A determination is made as to whether to highlight the message on the user's computer system (decision 852). This determination is made based on whether the user selected checkbox 814. If the user did not select checkbox control 814, then decision 852 branches to "no" branch 854 whereupon send message processing ends at 855. On the other hand, if the user did select checkbox 814, then decision 852 branches to "yes" branch 858 in order to copy the message text to the second instant messaging session window that includes copies of selected messages.

A determination is made as to whether the second instant messaging session window already exists (decision 860). If the second instant messaging session window does not exist, then decision 860 branches to "no" branch 862 whereupon, at step 865, it is created. On the other hand, if the second instant messaging session window already exists, then decision 860 branches to "yes" branch 868 bypassing step 865.

At step 870, the message that the user sent using send dialog 810 is added (copied) to the second instant messaging session window. At step 875, the position of the copied message in the first instant messaging session window is stored for later retrieval, and at step 880 a graphical navigational control is created and displayed in a position proximate (near) to where the message appears in the second instant messaging session window. At step 885, the graphical navigational control is associated with the stored position, and at step 890, the graphical navigational is displayed in a position proximate to the message as it appears in the second instant messaging session window. For an example of a graphical navigational control, see control 475 in FIG. 4. Send message processing thereafter ends at 895.

One of the preferred implementations of the invention is a client application, namely, a set of instructions (program code) or other functional descriptive material in a code module that may, for example, be resident in a computer readable medium, such as the random access memory of an information handling system, such as a computer system. Until required by the computer, the set of instructions may be stored in another computer readable medium, for example, in a hard disk drive, or in a removable computer readable medium, such as an optical disk (for eventual use in a CD ROM) or floppy disk (for eventual use in a floppy disk drive). The set of instructions may also be downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Functional descriptive material is information that imparts functionality to a machine. Functional descriptive material includes, but is not limited to, computer programs, instructions, rules, facts, definitions of computable functions, objects, and data structures.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer-implemented method comprising:
    during an instant messaging session between a first computer system used by a first instant messaging participant and a second computer system used by a second instant messaging participant:
    displaying, on a display device accessible to the first computer system, a first plurality of received instant messaging messages sent to the first instant messaging participant from the second instant messaging participant and a second plurality of sent instant messaging messages sent from the first instant messaging participant to the second instant messaging participant, wherein the first plurality of received instant messaging messages and the second plurality of sent instant messaging messages are displayed in a time-based order in a first instant messaging session window;
    receiving a notification corresponding to a selected one of the first plurality of received instant messaging messages that is displayed in the first instant messaging session window, wherein the receiving further comprises retrieving an indicator included in the selected received instant messaging message when the selected received instant messaging message was received from the second computer system, wherein the indicator was added to the selected received instant messaging message by a computer system selected from the group consisting of the second computer system and an instant messaging server computer system that facilitates the instant messaging session; and
    in response to receiving the notification, displaying the selected received instant messaging message on the display device in a second instant messaging session window while including the selected received instant messaging message in the first instant messaging session window.

2. The method of claim 1 wherein the indicator was added to the selected received instant messaging message by the instant messaging server computer system in response to identifying one or more words included in the selected received instant messaging message.

3. The method of claim 1 wherein the first instant messaging session window is a scrollable window, and wherein a minority of the first and second plurality of displayed instant messaging messages in the first instant messaging session window are visible at one time, the method further comprising:
    displaying a graphical navigational control in a position proximate to the selected received instant messaging message displayed in the second instant messaging session window;
    detecting a selection of the graphical navigational control by the first instant messaging participant; and
    in response to the detecting, scrolling the first instant messaging session window to a point where the selected received instant messaging message is visible in the first instant messaging session window.

4. The method of claim 1 further comprising:
    receiving a deselection notification corresponding to the selected received instant messaging message displayed in the second instant messaging session window; and
    removing the selected received instant messaging message from the second instant messaging session window in response to receiving the deselection notification.

5. The method of claim 1 further comprising:
    retrieving a plurality of text to send from the first instant messaging participant to the second instant messaging participant;

receiving a second notification from the first instant messaging participant, the second notification corresponding to the plurality of text and the second notification indicating that the plurality of text is important;

creating a new instant messaging message that includes the plurality of text and a flag indicating that the plurality of text is important; and sending the created new instant messaging message to the second instant messaging participant, wherein, when received by the second instant messaging participant, the created new instant messaging message will be displayed in two instant messaging session windows on a second display accessible by the second computer system.

6. A information handling system comprising:
one or more processors;
a memory accessible by at least one of the processors;
a nonvolatile storage area accessible by at least one of the processors;
a display device accessible by at least one of the processors;
a network interface that connects the information handling system to a computer network; and
a set of instructions stored in the memory and executed by at least one of the processors in order to perform actions of:
during an instant messaging session between the information handling system used by a first instant messaging participant and a second information handling system used by a second instant messaging participant:
displaying, on the display device, a first plurality of received instant messaging messages sent to the first instant messaging participant from the second instant messaging participant and a second plurality of sent instant messaging messages sent from the first instant messaging participant to the second instant messaging participant, wherein the first plurality of received instant messaging messages and the second plurality of sent instant messaging messages are displayed in a time-based order in a first instant messaging session window;
receiving a notification corresponding to a selected one of the first plurality of received instant messaging messages that is displayed in the first instant messaging session window, wherein the receiving further comprises retrieving an indicator included in the selected received instant messaging message when the selected received instant messaging message was received from the second information handling system, wherein the indicator was added to the selected received instant messaging message by a computer system selected from the group consisting of the second information handling system and an instant messaging server computer system that facilitates the instant messaging session; and
in response to receiving the notification, displaying the selected received instant messaging message on the display device in a second instant messaging session window while including the selected received instant messaging message in the first instant messaging session window.

7. The information handling system of claim 6 wherein the indicator was added to the selected received instant messaging message by the instant messaging server computer system in response to identifying one or more words included in the selected received instant messaging message.

8. The information handling system of claim 6 wherein the first instant messaging session window is a scrollable window, wherein a minority of the first and second plurality of displayed instant messaging messages in the first instant messaging session window are visible at one time, and wherein the set of instructions perform further actions comprising:
displaying a graphical navigational control in a position proximate to the selected received instant messaging message displayed in the second instant messaging session window;
detecting a selection of the graphical navigational control by the first instant messaging participant; and
in response to the detecting, scrolling the first instant messaging session window to a point where the selected received instant messaging message is visible in the first instant messaging session window.

9. The information handling system of claim 6 wherein the set of instructions perform further actions comprising:
receiving a deselection notification corresponding to the selected received instant messaging message displayed in the second instant messaging session window; and
removing the selected received instant messaging message from the second instant messaging session window in response to receiving the deselection notification.

10. A computer program product stored in a non-transitory computer readable-medium, comprising functional descriptive material that, when executed by an information handling system, causes the information handling system to perform actions that include:
running an instant messaging session between a first computer system used by a first instant messaging participant and a second computer system used by a second instant messaging participant, during the instant messaging session:
displaying, on a display device accessible to the first computer system, a first plurality of received instant messaging messages sent to the first instant messaging participant from the second instant messaging participant and a second plurality of sent instant messaging messages sent from the first instant messaging participant to the second instant messaging participant, wherein the first plurality of received instant messaging messages and the second plurality of sent instant messaging messages are displayed in a time-based order in a first instant messaging session window;
receiving a notification corresponding to a selected one of the first plurality of received instant messaging messages that is displayed in the first instant messaging session window, wherein the receiving further comprises retrieving an indicator included in the selected received instant messaging message when the selected received instant messaging message was received from the second computer system, wherein the indicator was added to the selected received instant messaging message by a computer system selected from the group consisting of the second computer system and an instant messaging server computer system that facilitates the instant messaging session; and
in response to receiving the notification, displaying the selected received instant messaging message on the display device in a second instant messaging session window while including the selected received instant messaging message in the first instant messaging session window.

11. The computer program product of claim 10 wherein the indicator was added to the selected received instant messaging message by the instant messaging server computer system in response to identifying one or more words included in the selected received instant messaging message.

12. The computer program product of claim 10 wherein the first instant messaging session window is a scrollable window, and wherein a minority of the first and second plurality of displayed instant messaging messages in the first instant messaging session window are visible at one time, and wherein the functional descriptive material causes the data processing system to perform additional actions comprising:
  displaying a graphical navigational control in a position proximate to the selected received instant messaging message displayed in the second instant messaging session window;
  detecting a selection of the graphical navigational control by the first instant messaging participant; and
  in response to the detecting, scrolling the first instant messaging session window to a point where the selected received instant messaging message is visible in the first instant messaging session window.

13. The computer program product of claim 10 further comprising functional descriptive material that causes the data processing system to perform additional actions that include:
  receiving a deselection notification corresponding to the selected received instant messaging message displayed in the second instant messaging session window; and
  removing the selected received instant messaging message from the second instant messaging session window in response to receiving the deselection notification.

14. The computer program product of claim 10 further comprising functional descriptive material that causes the data processing system to perform additional actions that include:
  retrieving a plurality of text to send from the first instant messaging participant to the second instant messaging participant;
  receiving a second notification from the first instant messaging participant, the second notification corresponding to the plurality of text and the second notification indicating that the plurality of text is important;
  creating a new instant messaging message that includes the plurality of text and a flag indicating that the plurality of text is important; and
  sending the created new instant messaging message to the second instant messaging participant, wherein, when received by the second instant messaging participant, the created new instant messaging message will be displayed in two instant messaging session windows on a second display accessible by the second computer system.

* * * * *